No. 871,976. PATENTED NOV. 26, 1907.
G. S. WHITNEY.
GRADING MACHINE.
APPLICATION FILED AUG. 28, 1907.
2 SHEETS—SHEET 1.
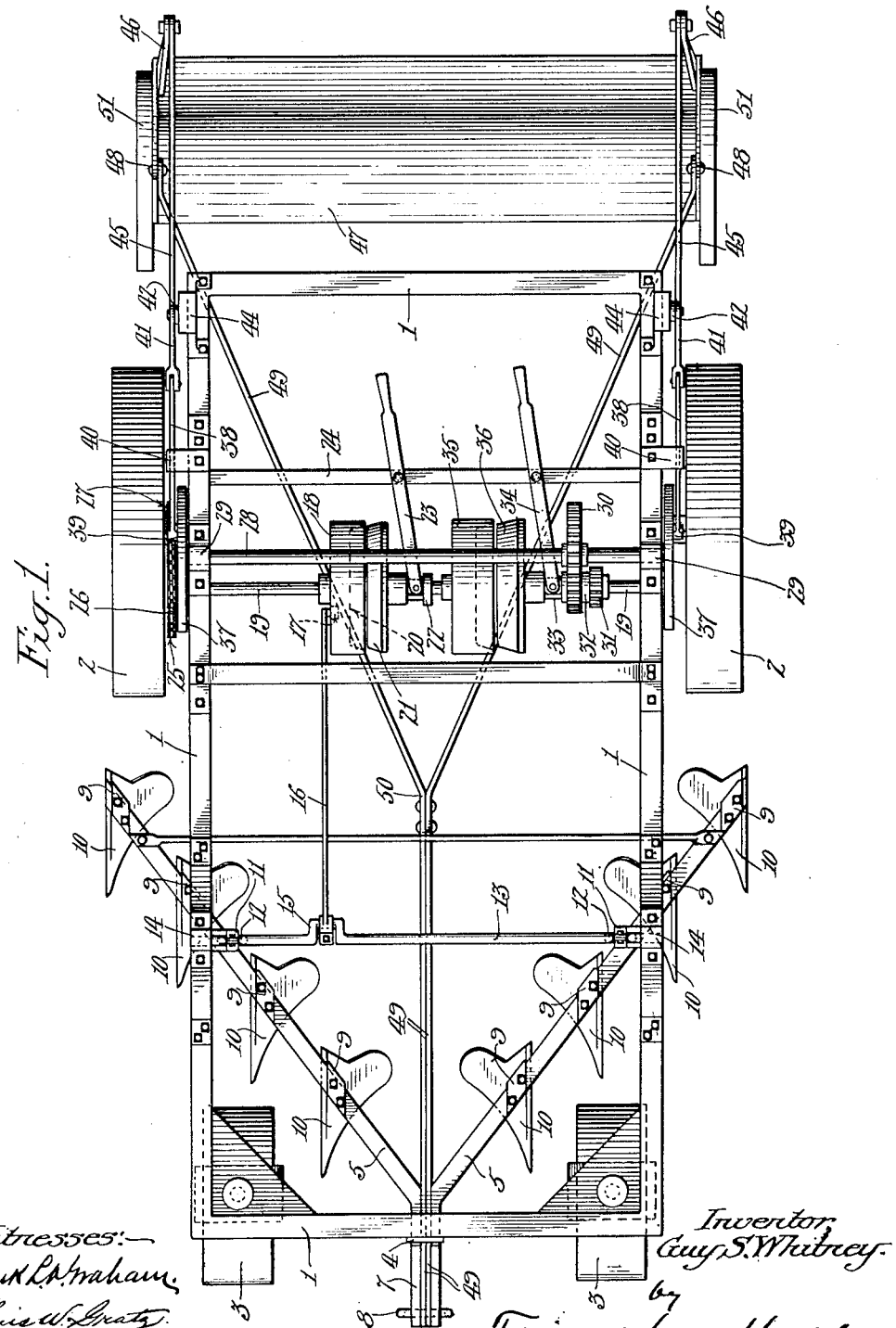

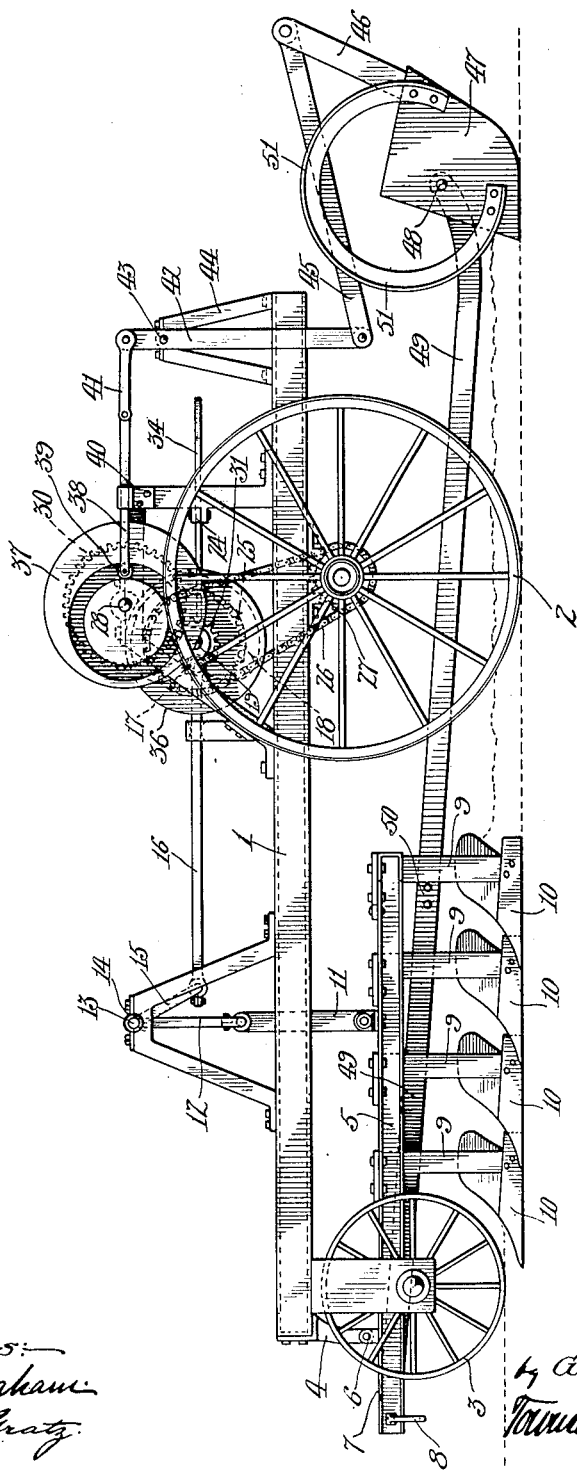

UNITED STATES PATENT OFFICE.

GUY S. WHITNEY, OF LINDSAY, CALIFORNIA.

GRADING-MACHINE.

No. 871,976.     Specification of Letters Patent.     Patented Nov. 26, 1907.

Application filed August 28, 1907. Serial No. 390,556.

*To all whom it may concern:*

Be it known that I, GUY S. WHITNEY, a citizen of the United States, residing at Lindsay, county of Tulare, and State of California, have invented a new and useful Grading-Machine, of which the following is a specification.

This invention relates to grading machines and the objects of the invention are to provide for adjusting and operating the plows and scraper by power mechanism controlled by levers.

The accompanying drawings illustrate the invention, and referring thereto:—Figure 1 is a plan view of the machine. Fig. 2 is a side elevation of the machine.

The machine comprises a main frame 1 rectangular in shape, which at the rear is supported by wheels 2 and at the front by wheels 3. A depending bracket 4 at the front of the frame 1 acts to support a plow frame 5, the latter having a pivotal connection therewith at 6, the frame 5 having a fork 7 at the front provided with a ring 8 for the attachment of motive power, such as a traction engine or teams. It will be noted that the motive power is attached directly to the plow frame 5, the latter having merely a supporting connection with the frame 1 of the machine, and thus the machine properly does not act as an intermediary in pulling the plows, but acts as a support therefor.

The plow frame 5 comprises two rearwardly diverging bars, to each one of which is bolted a series of posts 9, carrying at their lower ends plows 10. Pivoted to each bar 5 is a link 11 and each link 11 is at its upper end pivotally connected to a crank-arm 12 which is formed on a cross shaft 13 mounted in bearings 14 on the frame 1. The cross shaft 13 may be termed the plow-controlling shaft, and is provided with a crank 15, to which is attached a connecting rod 16. The rear end of the connecting rod 16 is provided with a roller 17, which rides in a grooved cam 18, the cam 18 being loosely mounted on a clutch shaft 19. The cam 18 has a conically cupped face 20, which is adapted to be frictionally engaged with a cone clutch member 21, the latter being splined on shaft 19, and having a grooved collar 22 which is engaged by a forked lever 23, the latter being pivoted to a cross-bar 24. By shifting the lever 23 the clutch 21 may be moved into frictional engagement with cam 18, and the latter thereby caused to rotate with clutch shaft 19 and actuate plow shaft 13 through the medium of connecting rod 16, so that as the plow shaft 13 is rotated its crank arms 12 acting through links 11 serve to elevate or lower the plow frame 5 to the desired elevation, the plow frame swinging on its pivot 6, and in this manner the cutting depth of the plows 10 may be controlled. For example, they may be dropped into plowing position as indicated in Fig. 2, or by throwing in clutch 21 the crank arms 12 may be turned through half a revolution or any part thereof to elevate the plows above the surface of the ground. As soon as the plows are thus elevated, the clutch 21 should be thrown out of engagement with cam 18. To lower the plows from their raised position, the collar 21 is again thrown into engagement with the cam 18 and the crank arms 13 revolved through another half revolution which restores them to the position shown in Fig. 2 with the plows in position for plowing.

The shaft of one of the wheels 2 carries a sprocket 25, clearly seen in Fig. 2, which is connected by a sprocket chain 26 with a sprocket 27 mounted on the end of shaft 19. An intermediate shaft 28 is journaled in bearings 29 on the frame 1, and a gear 30 on the intermediate shaft 28 is adapted to mesh with a gear 31 which is mounted on a sleeve 32, the latter being splined on clutch shaft 19 and having a grooved collar 33, which is engaged by a forked lever 34 pivoted to the cross-bar 24. Rigidly mounted on shaft 19 is a hollow cone clutch member 35, and formed on sleeve 32 is a cone clutch member 36. By shifting hand lever 34, the cone 36 may be engaged with clutch member 35 and at the same time pinion 31 is thrown into mesh with gear 30, whereupon the rotating shaft 19 imparts rotation to intermediate shaft 28. On each end of intermediate shaft 28 is a grooved cam 37 and associated with each cam 37 is a sliding bar 38, having a roll 39 which engages the grooved cam 37. Each bar 38 is slidably supported in a standard 40, and the rear end of each bar 38 is pivotally connected by a link 41 with the upper end of a lever 42, each lever 42 being pivoted at 43 to a standard 44. Pivotally connected to the lower end of each lever 42 is a link 45, the rear end of each link 45 being pivotally connected to an arm 46, each arm 46 being attached to a scraper 47. The scraper 47 at each end is pivoted at 48 to the rear ends of a pair of draw-bars. As shown in Fig. 1 the rear portions of draw-bars 49 converge forwardly and unite at an intermediate point 50, from which point they continue forward parallel, and their front ends pass between fork 7, before referred to, and are connected with the ring 8. The front ends of draw-bars 49 are likewise pivoted at 6. By operating the lever 34, shaft 28 may be caused to rotate as before described, and through the medium of cams 37 may be caused to act through the before described linkage to rock the scraper 47 on its pivotal points 48 to dump the same. In order to support the scraper 47 while in dumping position, a pair of circular runners 51 are secured to each end of the scraper, so that when the scraper is in dumping position the runners 51 ride on the ground and support the scraper, thus preventing the scraper from dragging along earth which has been dumped, which it would be apt to do if allowed to sag down under its own weight.

What I claim is:—

1. A grading machine comprising a main frame, supporting wheels therefor, a plow frame pivotally supported at the front of the main frame and extending rearwardly, plows on the plow frame, a scraper frame pivotally supported at the front of the main frame and extending rearwardly beyond the plow frame, a scraper on the scraper frame, and mechanism operated by said wheels for adjusting the height of the plow frame and controlling the scraper.

2. A grading machine comprising a main frame, supporting wheels therefor, a plow frame pivotally supported at the front of the main frame and extending rearwardly, plows on the plow frame, a scraper frame pivotally supported at the front of the main frame and extending rearwardly beyond the plow frame, a scraper on the scraper frame, mechanism operated by said wheels for swinging the plow frame to various elevations, and mechanism operated by said wheels for swinging the scraper on the scraper frame.

3. A grading machine comprising a main frame, supporting wheels therefor, a plow frame pivotally supported at the front of the main frame and extending rearwardly, plows on the plow frame, a scraper frame pivotally supported at the front of the main frame and extending rearwardly beyond the plow frame, a scraper on the scraper frame, mechanism operated by said wheels for swinging the plow frame to various elevations, mechanism operated by said wheels for swinging the scraper on the scraper frame, and circular runners on the scraper for supporting the scraper when the latter is inverted.

4. A grading machine comprising a main frame, supporting wheels therefor, a plow frame pivotally supported at the front of the main frame and extending rearwardly, plows on the plow frame, a scraper frame pivotally supported at the front of the main frame and extending rearwardly beyond the plow frame, a scraper on the scraper frame, a cam shaft geared to the wheels, a cam on the cam shaft, a crank shaft, links connecting the crank shaft and plow frame, a rod connected to the crank shaft and having operative connection with the cam, and clutch means for causing the cam to rotate with the clutch shaft or stand idle.

5. A grading machine comprising a main frame, supporting wheels therefor, a plow frame pivotally supported at the front of the main frame and extending rearwardly, plows on the plow frame, a scraper frame pivotally supported at the front of the main frame and extending rearwardly beyond the plow frame, a scraper on the scraper frame, a cam shaft geared to the wheels, a cam on the cam shaft, a crank shaft, links connecting the crank shaft and plow frame, a rod connected to the crank shaft and having operative connection with the cam, and clutch means for causing the cam to rotate with the clutch shaft or stand idle, an intermediate shaft, cams on the intermediate shaft, linkage between the latter cams and the scraper for swinging the scraper on its frame, a gear on the intermediate shaft, a pinion on the cam shaft, a cone clutch on the cam shaft one member of which is connected to the pinion, and a lever for shifting the pinion into mesh with the gear and simultaneously closing the cone clutch.

In testimony whereof, I have hereunto set my hand at Lindsay, Cal., this 21st day of August, 1907.

GUY S. WHITNEY.

In presence of—
J. E. SEEGMILLER,
W. J. SPARHAM.